July 22, 1952     C. PICCARDO     2,604,444
METHOD FOR CONTINUOUSLY SOFTENING
WATER AND APPARATUS THEREFOR
Filed July 24, 1947

INVENTOR
CESARE PICCARDO

ATTORNEY

UNITED STATES PATENT OFFICE 2,604,444

METHOD FOR CONTINUOUSLY SOFTENING WATER AND APPARATUS THEREFOR

Cesare Piccardo, Genoa, Italy

Application July 24, 1947, Serial No. 763,345
In Germany April 7, 1941

Section 1, Public Law 690, August 8, 1946
Patent expires April 7, 1961

7 Claims. (Cl. 210—23)

This invention relates to a method and apparatus for continuously softening water, particularly boiler feed water, by precipitation of the hardness-forming salts and subsequent removal of the precipitates or mud particles, and in which the mud particles, before being removed from the water, act as crystallisation nuclei or catalysts for accelerating the precipitation of the hardness salts from the water, under the action of a precipitant.

The known processes of this class, on account of the imperfect mixture, the non-uniformity of temperature and insufficient mechanical effect available for the catalisation, involve the use of voluminous and expensive reaction receptacles. The known processes are furthermore subject to substantial losses of reagents.

The object of the invention is to provide a process and apparatus by which these inconveniences are overcome and a very effective and inexpensive purifying equipment is provided.

To this end, according to the present invention it is essential that the precipitation of the hardness salts and the removal of the precipitates constitute two distinct steps and be performed in separate receptacles, whereby in one of the receptacles or reactor the precipitation is effected in the quickest and most complete manner, while in the second receptacle or mud separator the water coming from the reactor and containing in suspension the muddy particles is freed from the mud, in a known manner.

In order that the precipitation be effected in the quickest and most complete manner and in very compact devices, according to the invention there is a provision for a thorough mixing of the raw water and the precipitating reagents by causing same to be fed in at substantially the bottom end of an unobstructed reactor, viz. a reactor whose interior is not obstructed by filters, baffles, diaphragms or the like, the feeding being effected in a tangential direction, in order to impart to the fluids to be mixed a whirling motion in horizontal direction. At the same time, heating fluids such as steam or extracted boiler water are fed through impelling nozzles of jet pumps whose suction side is connected at a point near the top end of the unobstructed reactor, where softened water containing mud particles is present. In this manner, a forced circulation in vertical direction is also promoted which increases considerably the whirling motion in the horizontal direction and promotes uniform heating and thorough mixing of raw water, reagents and mud particles which being "sown" into the liquid, act as crystallisation nuclei and greatly accelerate the precipitation, at the same time promoting the formation of substantially large mud particles which are easy to separate outside of the reactor proper. Thus the reactor always remains in functioning order, as no accumulation of precipitates takes place in it.

Thus according to the invention, within a single filterless reaction receptacle or "reactor," the fresh water, the heating steam, and possibly also the boiler water extraction, are conveyed into the conical bottom of the reactor by means of pipings tangentially connected with, and uniformly distributed in said conical bottom while the reagent for precipitating the hardness salts of the water is fed from a receptacle arranged on the reactor body and discharged in said conical bottom of the reactor through a descending pipe arranged internally of said reactor.

Furthermore the heating fluids such as steam and boiler water extraction are introduced into the conical bottom of the reactor by jet pumps arranged each at the lower end of a descending pipe, situated at the outside of the reactor and connected at the upper end with the top part of the purifier. By this arrangement both suction and pressure chambers of the jet pumps are brought into a static equilibrium of pressure and the suction takes place from a space of the reactor in which purified water is present.

Due to this arrangement of the different fluid inlet pipings on the reactor, and to the increase in the volume of the fluids by the water sucked by the jet pumps, a whirling motion in a horizontal direction and a circulation in a vertical direction are attained. This results in a perfect admixture and a quiet heating of the fluids, a uniform temperature and an acceleration of the precipitation by the action of the precipitates generated by the reaction, thus completely utilising the reagent even if same should be enveloped by the precipitates. The purification of the water is therefore effective and economical.

As by the water purifying means according to the invention the circulation within the mass of water must take place at predetermined rates to ensure uniformity of mixture and of temperature and the required effect of catalysation and further, as uniformity of raw water feed is required in order to keep a constant ratio between the water to be purified and the amount of reagent solution, it is necessary to provide that the fluid admission ports to the purifier be exactly gauged and be either completely opened or closed so as not to present variable sections of passage which would modify the relative rate of flow of said fluids. Also the characteristics of the heating fluids which also serve as propelling means for the jet pumps have to be maintained possibly constant.

A further object of the invention is to provide a device for controlling the feed of the different fluids including the reagent solution to the purifier and the feed of water to the reagent container by valve means adapted to be automatically operated by a hydraulic float-controlled three-way trip valve.

This device consists in a combination of shut-off valves adapted for operation by a hydraulic distance control, arranged on the pipings of the fresh water, of the heating steam and possibly also for the boiler water extraction. In this valve system a float arranged in the feed water receptacle controls a three-way trip valve so as to completely open or close the required ports according to whether the tank of purified water requires water or not.

It is also possible to operate the feed of the heating fluids by similar automatic valves controlled by temperature sensitive devices under the influence of the temperature of the water within the reactor.

The flow of fresh water past the shut-off valve is divided, by means of two controllable gauged branch pipings, into two separate flows, one for conveying the water to be purified to the purifier and the other for conveying to the reagent container the water necessary for saturation with reagent. The saturated reagent solution thus formed is discharged from the saturation receptacle through an overflow and passed into the lower part of the reactor. The saturation receptacle should always contain the reagent to be dissolved in excess. The reagent contained is arranged on the reactor body so that a portion thereof is heated by the hot water contained within the reactor and another part is cooled by exposure to the outside air. This promotes a circulation by convection of its liquid contents and a quick and uniform saturation of the water is obtained.

By this water purifying process, due to the continuous movement to which the reactor contents is subjected, the precipitates are always uniformly distributed throughout the purifier water. The precipitates are easily removed, without having to use bulky decanting apparatus of filters which get easily obstructed, by means of a known mud separator, preferably a separator such as described in the specification of U. S. Patents No. 1,774,211 and No. 2,042,122.

One embodiment of purifier equipment according to the present invention is shown in the accompanying drawings.

Figure 1:
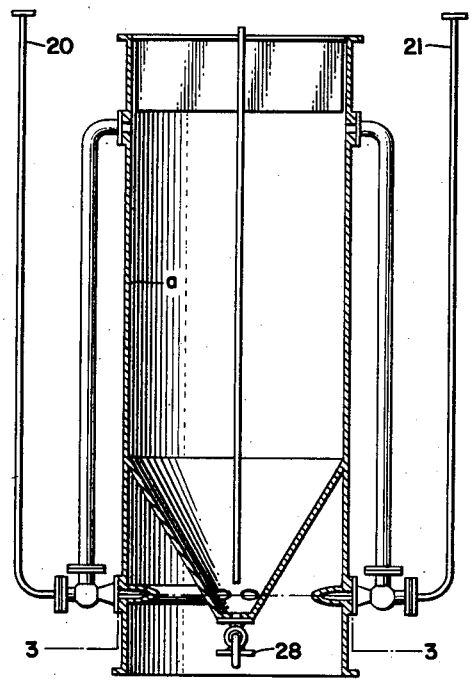
Figures 1 and 2 are vertical sections in planes at 90° through a reactor according to the invention.
Figure 2:
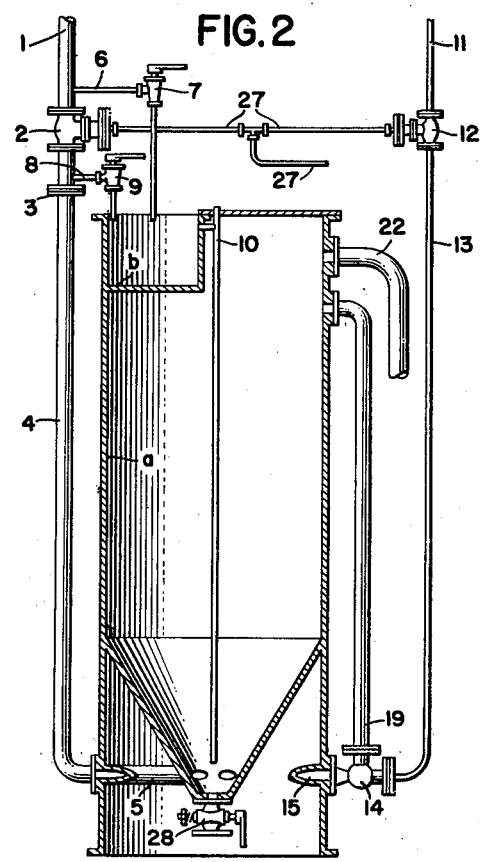
Figure 4:
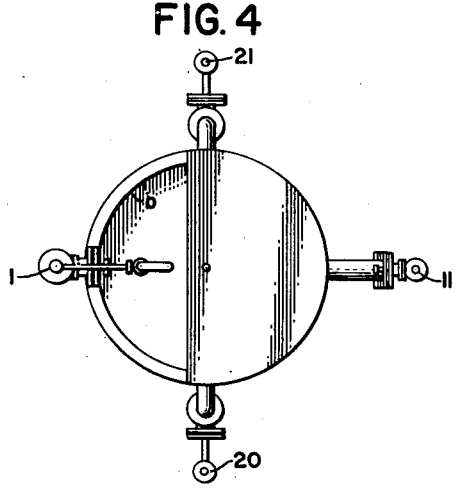
Figure 4 is a plan view of Figure 2.
Figure 3:
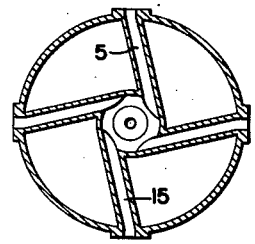
Figure 3 is a cross section on line 3—3 of Figure 1.

In these figures $a$ is the reactor, and $b$ the reagent container.

The fresh water is admitted to the reactor through piping 1, diaphragm valve 2, gauge lens 3, piping 4 and tangential piping 5. Ahead of the diaphragm valve 2, the branch piping 6 is arranged, provided with a cock 7, and serving for filling the reagent container $b$ with water before the equipment is started in operation.

Behind the diaphragm valve 2, but ahead of the gauge lens 3, a further branch piping 8 with control cock 9 is provided for feeding fresh water into the reagent container $h$ in a predetermined relation to the quantity of water flowing through lens 3. This water introduced into the container $b$ becomes saturated with reagent and then passes through overflow and pipe 10 into the bottom part of the reactor, in order to be mixed there with the water to be purified.

The heating steam is admitted into the reactor through piping 11, diaphragm valve 12, piping 13, jet pump 14 and tangential piping 15.

The boiler water extraction is admitted into the reactor through pipe 20 in the same manner as the heating steam. Steam may be fed also into piping 21 by connecting the same to pipe 13.

The purified water containing in suspension muddy particles leaves the reactor through piping 22, passes into a mud separator (not shown) and thereafter is led into a tank (not shown) of purified water. In this tank a float is arranged which mechanically operates a three-way trip valve. This trip valve controls the admission of water or steam under pressure into piping 27. If the water level in the tank of purified water rises, the float operates the trip valve so as to close its discharge opening and open communication to piping 27 to thereby close the diaphragm valves 2 and 12. If, however, the level in the tank of purified water sinks under a predetermined level just the opposite effect occurs whereby the diaphragm valves are opened.

The reactor contents can be discharged through the cock 28.

I claim:

1. A method for continuously softening water, particularly boiler feed water, by precipitation of the hardness forming salts in a reactor to which is fed the raw water, the precipitating reagent and heating fluids, characterized by the feature that the water to be softened, the reagent and the heating fluids are fed tangentially at the bottom of the reactor, so as to impart to the contents of the reactor a whirling motion in the horizontal direction and that at the same time softened water containing in suspension recently precipitated mud particles and residues of reagents is drawn from a point below the surface of the water in the reactor and forcedly fed into the bottom end so as to promote a forced circulation in vertical direction, to increase the circulation in horizontal direction and to seed the mud particles throughout the liquid under reaction, such mud particles acting as crystallisation nuclei and promoting precipitation, while a part of the liquid which has undergone softening, together with the mud particles accrued by precipitation of hardness salts on the crystallisation nuclei are discharged from the surface of the water in the reactor.

2. A method according to claim 1, in which the forced circulation in vertical direction is promoted by feeding heating steam into the impelling nozzle of a jet pump whose suction end is connected to a point near the top of the reactor and whose pressure end opens into the bottom of said reactor.

3. A method according to claim 1 in which the forced circulation in vertical direction is promoted by feeding hot fluids under pressure into impelling nozzles of jet pumps whose suction ends are connected to points near the top of the reactor and whose pressure ends open tangentially into the bottom of the same reactor.

4. An apparatus for continuously softening water comprising a reactor embodied by an unobstructed container, of substantial height and having a bottom of substantially circular cross section, a raw water inlet opening tangentially into said bottom, heating fluid inlet pipes opening also tangentially into said bottom, a reagent container, a water inlet pipe connected to said reagent container, an outlet pipe connected to said reagent container and leading a saturated reagent solution into the bottom of said unobstructed reactor, pumping means, pipes connecting the suction side of said pumping means to said unobstructed reactor at a position near its top end, pipes connecting the pressure side of said pumping means with the interior of the bottom of said reactor and outlet pipes connected at a position which is near the top end of said reactor and which is above the connection of the suction pipe to the reactor.

5. An apparatus for continuously softening boiler water comprising a reactor embodied by an unobstructed container having a substantial height and provided with a substantially conical bottom, a raw water inlet opening tangentially into said conical bottom, a reagent container, a water inlet pipe connected to said reagent container, an outlet pipe connected to said reagent container and to the conical bottom of said reactor, feed pipes for hot fluid under pressure, a jet pump connected by its impelling nozzle to each of said hot fluid feed pipes, piping connecting the suction side of said jet pumps to a position near the top end of said unobstructed reactor, piping leading from the pressure side of said jet pumps into said conical bottom of the reactor and outlet pipes connected at a position which is near the top end of said reactor and which is above the connection of the suction pipe to the reactor.

6. An apparatus according to claim 5 in which the reagent container forms a compartment of the upper end of said reactor and its outlet pipe descends through said reactor and opens into the bottom thereof.

7. An apparatus according to claim 5 in which the reagent container is in the form of a compartment disposed at the top end of the reactor container and its outlet pipe descends within said reactor container to terminate with its open end in proximity to the bottom of such container, and in which the hot fluid under pressure is steam.

CESARE PICCARDO.

REFERENCES CITED

The following references are of record in the file of this patent:

UNITED STATES PATENTS

| Number | Name | Date |
|---|---|---|
| 273,778 | Strong | Mar. 13, 1883 |
| 695,399 | Kinsey | Mar. 11, 1902 |
| 846,845 | Greth | Mar. 12, 1907 |
| 850,503 | Sutro | Apr. 16, 1907 |
| 949,455 | Usher | Feb. 15, 1910 |
| 988,014 | Muller | Mar. 28, 1911 |
| 1,035,813 | Rice | Aug. 13, 1912 |
| 1,702,256 | Green | Feb. 19, 1929 |
| 1,788,149 | Contant | Jan. 6, 1931 |
| 2,042,122 | Piccardo | May 26, 1936 |
| 2,160,832 | Contant | June 6, 1939 |
| 2,300,430 | Morrell et al. | Nov. 3, 1942 |
| 2,365,293 | Robinson | Dec. 19, 1944 |

FOREIGN PATENTS

| Number | Country | Date |
|---|---|---|
| 259,482 | Germany | May 6, 1913 |